GRANT M. SMITH &
EARL R. HIBBARD
INVENTORS

BY Nathan N. Kallman

ATTORNEY

SIGNAL GENERATOR

Filed Nov. 28, 1960 3 Sheets-Sheet 2

GRANT M. SMITH & EARL R. HIBBARD
INVENTORS

BY Nathan N. Kallman

ATTORNEY

GRANT M. SMITH &
EARL R. HIBBARD
INVENTORS

BY Nathan N. Kallman

ATTORNEY

United States Patent Office 3,059,052
Patented Oct. 16, 1962

3,059,052
SIGNAL GENERATOR

Grant M. Smith, Cupertino, and Earl R. Hibbard, Sunnyvale, Calif., assignors to Ampex Corporation, Redwood City, Calif., a corporation of California Filed Nov. 28, 1960, Ser. No. 72,095
13 Claims. (Cl. 178—69.5)

This invention relates to the generation of high precision signals such as are used in television, and more particularly to systems and circuits for generating precise blanking signals in television signals reproduced for broadcast purposes.

A television broadcast signal, whether for black and white or for color, is required to follow precisely specified timing and waveform characteristics. For example, the existing broadcast standards define blanking intervals for both horizontal and vertical synchronizing signals. The blanking intervals provide time periods during which the horizontal and vertical synchronizing pulses, color bursts and equalizing pulses can be added to form a composite television signal. In like manner, other wide band systems which utilize video signals often insert timing and marker pulses in order to derive the information content of the signals in an orderly manner When reproducing video information recorded by a wide band television signal reproducing system, it is usually necessary to regenerate the blanking and synchronizing signal waveforms in order that they meet the desired broadcast standards. In order to obtain reasonable immunity from noise, systems heretofore employed have utilized complex gating techniques for adding blanking and synchronizing signals. A number of other problems have been encountered, such as problems with time stability, particularly because vertical blanking generators have been unable to recover sufficiently rapidly following a signal interruption. It is also desirable, of course, that such problems be overcome by systems disposed in a minimum space and involving a minimum amount of circuitry. For greatest versatility, the systems and circuits employed should permit independent control of blanking widths and positions, without introducing an interaction between the variables when an individual control is manipulated.

It is therefore an object of the present invention to provide an improved circuit for generating parts of a television broadcast signal.

Another object of the present invention is to provide an improved system for reinserting blanking and synchronizing signals in a television signal generating system.

Yet another object of the present invention is to provide an improved system for processing a reproduced television signal for broadcast purposes.

Systems in accordance with the present invention utilize synchronizing pulses which are reproduced by a wide band recording and reproducing system to initiate delayed pulse sequences which ultimately provide vertical and horizontal blanking pulses. The delayed blanking pulses are precisely placed in time relative to adjacent video signal portions, have the proper waveforms for broadcast standards, and may be individually adjusted. The delayed blanking pulses are used to control addition of horizontal and vertical blanking to the composite signal.

In a specific form of system in accordance with this invention, reproduced and demodulated signals from a wide band reproducing system are processed so as to be converted into broadcast quality television signals. An RF synchronizing signal stripper circuit in the demodulator of the reproducing system provides synchronizing signal pulses to two delayed pulse generator chains, one of which is used for vertical blanking generation and the other of which is used for horizontal blanking generation. For vertical blanking, the synchronizing pulses are integrated and the integrated signal is used to trigger at least one phantastron arranged to generate a pulse which is delayed in time an amount corresponding to a full television field. The delayed pulse in turn actuates a monostable multivibrator to provide a vertical blanking pulse of selected duration. Horizontal blanking pulses are initiated by phantastrons which delay pulses from the synchronizing signal stripper circuit for the time equivalent of a full television line, and which then actuate a horizontal blanking monostable multivibrator. As these blanking pulses are generated, the video portion of the composite television signal is also delayed so as to again be in time correspondence to the blanking intervals. The blanking intervals are reinserted into the composite signal, and synchronizing signals (and color bursts if desired) are then superimposed on the blanking to provide a fully reconstituted composite signal of broadcast quality.

A better understanding of the invention may be had by reference to the following description, taken in conjunction with the accompanying drawings, in which.

Figure 1:
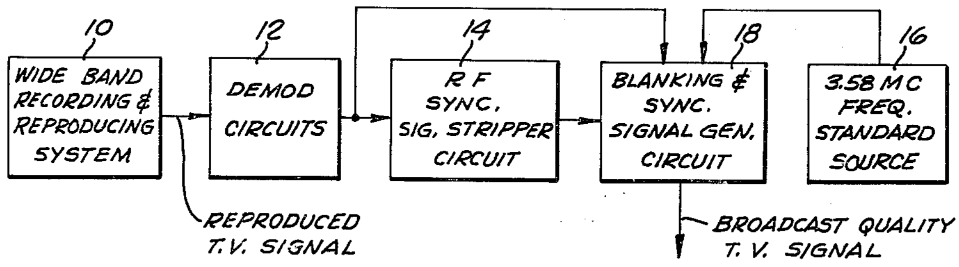
FIGURE 1 is a block diagram representation of the principal elements of a system for providing a television broadcast signal from a reproduced signal.

Referring now to FIGURE 1, reproduced television picture information may be derived from a wideband recording and reproducing system 10. A particularly efficient and practical form of wideband system utilizes a rotary magnetic head assembly on which are mounted a number of heads which scan transversely across a magnetic tape as it is moved longitudinally past the rotary head assembly. The relative movement of the rotary heads with respect to the tape provides an extremely high relative speed between head and tape, and at the same time permits the use of a number of automatic control arrangements which insure accurate recording and reproduction of the wideband signal. For example, a separate longitudinal track along the tape may be utilized for recording synchronizing information for use in playback, and the speed of the rotary head assembly may be varied in accordance with this synchronizing information.

In such systems, the video signals are usually recorded by frequency modulation for better response and linearity across the frequency band. Accordingly, a demodulator circuit 12 is utilized, the demodulator circuit acting to regenerate the video signal components (components from a few cycles per second to several megacycles or more per second) following the recombination in time of the signals from the various heads of the rotary head assembly. The demodulator circuit 12 is shown separate from the wideband recording and reproducing system 10 in order to clarify the relationships of the subsequent units. Also shown separately is a radio frequency (hereinafter RF) synchronizing signal stripper circuit 14. Signals from the demodulator circuit 12, the synchronizing signal stripper circuit 14 and frequency standard signals from a source 16 are each applied to a blanking and synchronizing signal generator circuit 18 in accordance with the invention.

As the wideband recording and reproducing system 10 operates to reproduce the composite television signal, the demodulator circuit 12 provides the recombined video signal portions as well as the old blanking and synchronizing signals from the original recording. The blanking and synchronizing signals do not usually meet the standards required for broadcast purposes, but do provide a useful timing reference for the operation of the blanking and synchronizing signal generator circuit 18. The synchronizing signal stripper circuit 14 is preferably an RF type of stripper circuit which introduces a delay in the process of extracting the synchronizing pulses from the composite signal. A particularly suitable example of such a stripper circuit is described in an earlier filed application Serial No. 19,610, filed April 4, 1960, by Earl R. Hibbard, and assigned to the same assignee. This circuit provides freedom from switching transients in the reproduced signal. The blanking and synchronizing signal generator circuit 18 operates, in effect, to remove the old blanking and synchronizing signals and to reinsert new and precisely formed wave shapes which define the blanking levels and intervals and the synchronizing signals.

Figure 2:
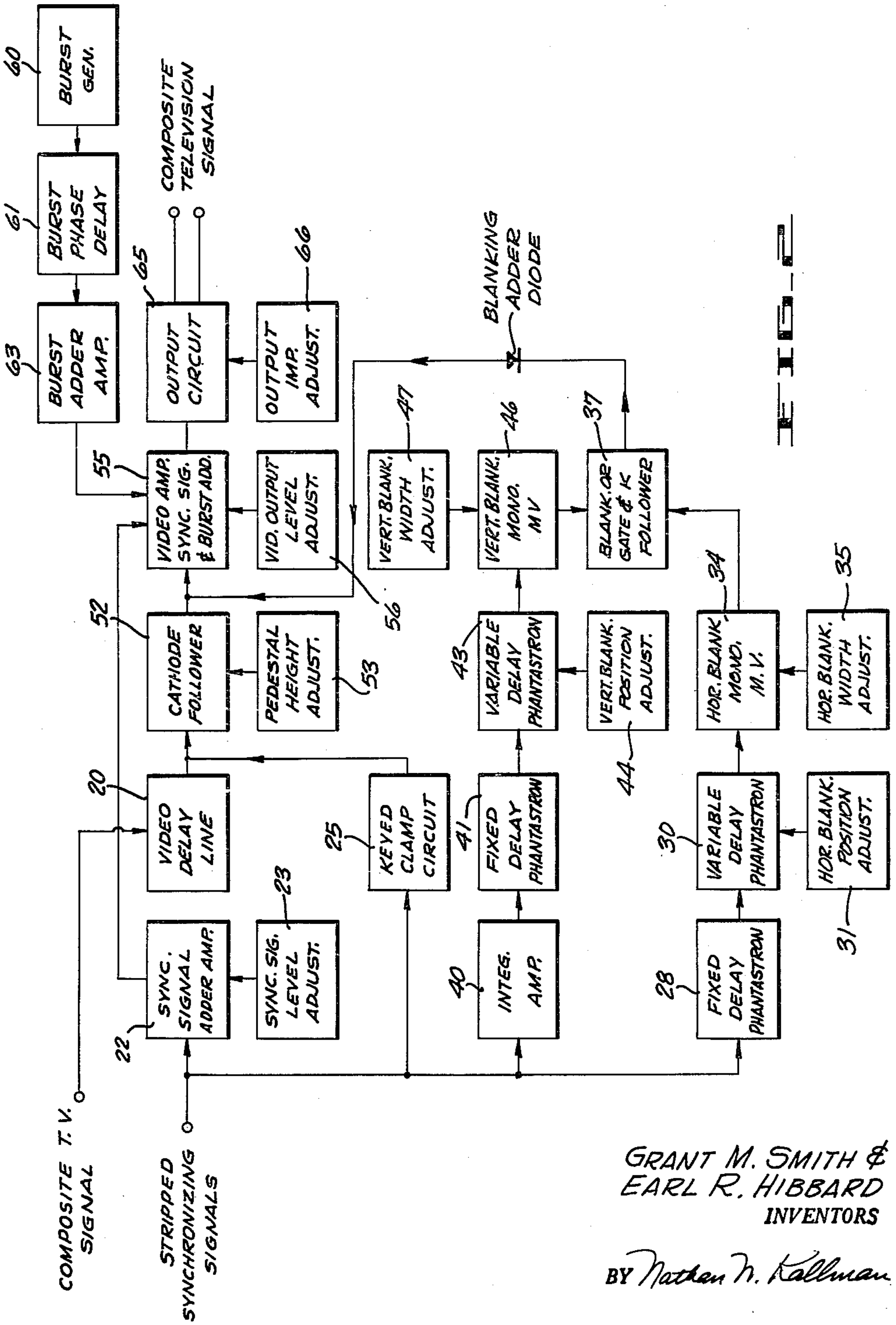
FIGURE 2 is a block diagram representation of a system in accordance with the invention for generating blanking and synchronizing signals for television broadcast purposes.

A detailed example of a system in accordance with the invention is shown in the block diagram of FIGURE 2. The composite television signal from the demodulator is applied to a video delay line 20, which introduces a selected delay so that the video signal portions are returned to proper time association to the synchronizing pulses, which have been relatively delayed at this point because of operation of the RF synchronizing signal stripper circuit. The stripped synchronizing signals, which are thereafter employed as delayed timing pulses, are applied in parallel to a number of different channels, one of which includes a synchronizing signal adder amplifier 22. The amplitude of the synchronizing signal provided from the synchronizing signal adder amplifier 22 may be varied by a level adjustment device 23, which may be a potentiometer contained within the amplifier 22 itself, or an associated circuit, but which is shown separately for clarity. The stripped synchronizing signals are also applied to a keyed clamp circuit 25 which is coupled to the output terminal of the video delay line 20, and which operates to shift the output signal from the video delay line 20 by a selected amount when keyed by the synchronizing signals. Appropriate circuit elements (not shown) may be used in conjunction with the video delay line 20 and the keyed clamp circuit 25 to provide D.C. restoration for the video signal portions in the composite television signal.

Both the new horizontal and the new vertical blanking signals are initiated by application of the stripped synchronizing pulses to pulse delay circuits. To provide the horizontal blanking signal, each stripped synchronizing pulse is applied to a fixed delay phantastron circuit 28 which provides a delay interval substantially equal to the time required for one-half a television line, or approximately 31 microseconds according to present U.S. standards. For this purpose, the phantastron circuit 28 may include a differentiating circuit, and a screen coupling on the phantastron tube to differentiate the leading edge of each horizontal synchronizing pulse so as to trigger the phantastrom which, in accordance with conventional phantastron operation, thereafter provides an output pulse on the screen after the desired delay interval. In like manner, the output pulse from the fixed delay phantastron 28 may be differentiated and its trailing edge used to trigger a variable delay phantastron 30 to provide another delay of one-half line time (31 microseconds). The circuit details may employ a number of well known components and accordingly have not been shown in detail. The actual amount of delay, and the subsequent position of the horizontal blanking signal in the composite television signal, is controlled by horizontal blanking position adjustment means 31, which may again be a potentiometer within the phantastron 30 itself.

The trailing edge of the output pulse provided from the variable delay phantastron 30 is then used to trigger a horizontal blanking monostable multivibrator 34 which generates a horizontal blanking pulse on controlled and selected duration whose leading and trailing edges define the time limits of a horizontal blanking interval. A horizontal blanking width adjustment 35 may operate conjointly with the monostable multivibrator 34 to control the duration of the pulse and thus the duration of the horizontal blanking interval in the composite signal. Pulses from the monostable multivibrator 34 are applied to one input of a gating circuit consisting of a blanking "OR" gate and cathode follower 37.

A similar delayed pulse generator is employed for vertical blanking signals. The onset of the vertical blanking interval in the composite television signal is identified by the occurrence of successive and closely spaced synchronizing pulses. As these pulses are applied to an integrator amplifier 40 the output signal from the amplifier 40 is differentiated and develops an output pulse having a leading edge which is delayed a precise amount relative to the leading edge of the vertical blanking interval. No output pulse is generated in response to horizontal synchronizing signals. Each output pulse is differentiated and the leading edge of the differentiated pulse is used to trigger a fixed delay phantastron 41 providing a delay of substantially one-half the television field time (approximately 8000 microseconds). The output pulse from the fixed delay phantastron 41 is again differentiated and applied to a variable delay phantastron 43, the delay time of which is precisely controlled by a vertical blanking position adjustment 44. Output pulses taken from the screen of the variable delay phantastron 43 are adjusted so that their trailing edges are one field time later than the start of the vertical blanking interval for the initiating vertical synchronizing pulses. Pulses obtained by differentiating these trailing edges trigger a vertical blanking monostable multivibrator 46, the duration of the output pulse from which may be determined by a vertical blanking width adjustment 47. The leading and trailing edges of the output pulses from the vertical blanking monostable multivibrator 46 define the time limits of the vertical blanking intervals and are then applied to the remaining input terminal of the blanking "OR" gate and cathode follower circuit 37.

The vertical and horizontal blanking pulses which are provided from the blanking "OR" gate and cathode follower circuit 37 may be considered as control gating signals. These signals are applied through a blanking adder diode 50 to an output terminal of a cathode follower 52 which is coupled to receive the video signal from the video delay line 20. When a vertical blanking or horizontal blanking pulse is applied to the blanking adder diode 50, the output signal from the cathode follower 52 is clamped at a selected blanking level, as controlled by a pedestal height adjustment device 53 coupled to the cathode follower 52.

The re-formed synchronizing signals are reinserted during the blanking intervals by application to a video amplifier synchronizing signal and burst adder circuit 55 along with the video signal to which the new blanking has been added. A video output level adjustment device 56 coupled to the video amplifier circuit 55 is again shown separately for clarity. Color bursts are added in the same manner as the synchronizing signals but with appropriate placement on the "back porch" of the horizontal blanking interval. Color bursts are initiated in conventional fashion by a 3.58 megacycle (mc.) burst generator 60 and applied to an adjustable phase delay device 61, and then to an adder amplifier 63 for final application to the video amplifier synchronizing signal and burst adder circuit 55.

Output signals derived from the video amplifier circuit 55 are applied to an output circuit 65 which may be a "totem pole" type of circuit providing output signals to a pair of terminals. An impedance level of approximately 75 ohms may be maintained on each of the output terminals by an output impedance adjustment device 66. The output signals derived from the output circuit 65 provide a composite television signal of broadcast quality and have a variable and controllable D.C. video level, pedestal height, and synchronizing signal amplitude.

Figure 3:
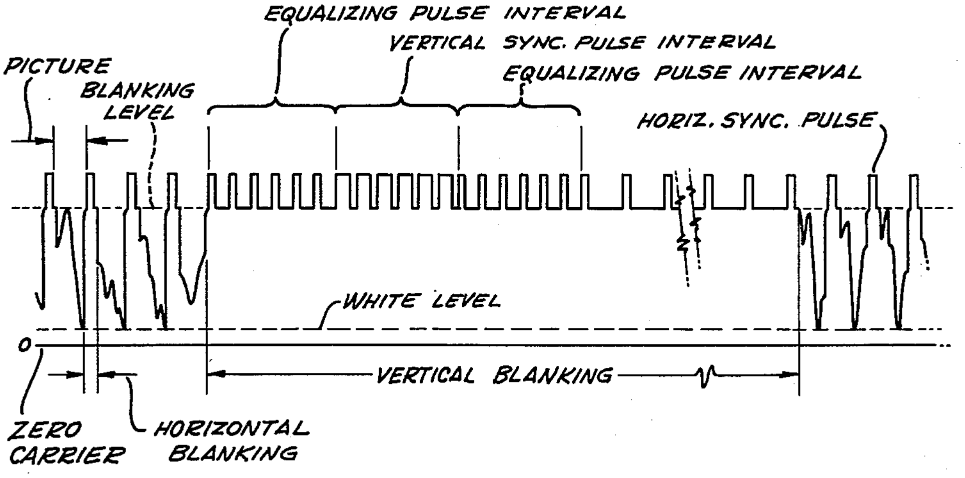
FIGURES 3, 4 and 5 are diagrams of waveforms representing in simplified form, and not to scale, the relationship of blanking and synchronizing signals to the video portions of a composite television broadcast signal, and FIGURE 6, consisting of waveforms 6(A) to 6(G), illustrates signal variations with time occurring at various points in the operation of the arrangement of FIGURE 2.
Figure 4:
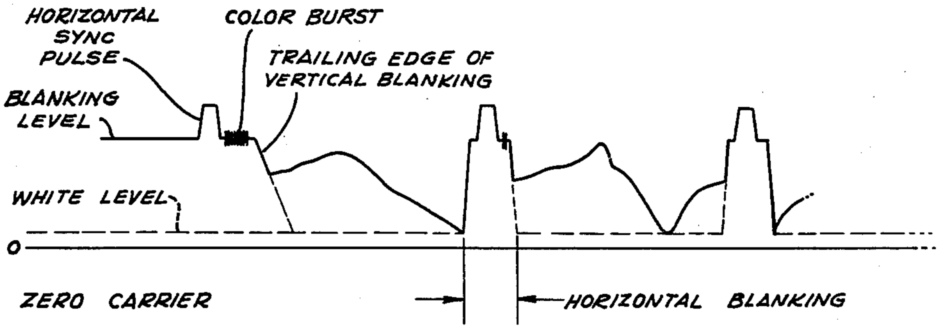
Figure 5:
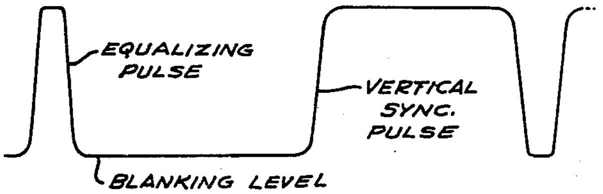

Representative segments of the characteristic composite television signal are shown in FIGURES 3, 4 and 5 to which reference may now be made. In FIGURES 3, 4 and 5 the relative dimensions are not shown in exact proportion, but have in some instances been modified to more clearly depict the relationships involved. In the convention adopted here, the black level has a higher positive amplitude than the white level, and the synchronizing signals are positive going. The waveforms shown represent only one envelope of a broadcast carrier whose central axis is illustrated in FIGURES 3 and 4. A vertical blanking interval is, as shown, a cyclically occurring relatively long interval (actually 0.07 times the interval from the start of one field to the start of the next field) on which are superimposed equalizing pulses, vertical synchronizing pulses and horizontal synchronizing pulses. Horizontal blanking intervals are recurring intervals interposed cyclically between the successive video signal intervals during which a single television line of video information is provided. Horizontal synchronizing pulses (best seen in FIGURE 4) are each superimposed on a different one of the horizontal blanking levels. Color bursts are added at the specified burst frequency on the "back porch" of the horizontal blanking intervals.

Some idea of the exactitude of the standards to be met may be gained from the fact that the amplitude of the blanking level is required to be $0.075 \pm 0.025$ times the maximum carrier voltage. The leading and trailing edges of the vertical blanking should be complete in less than 0.1 H, where H is the time from the start of one line to the start of the next line. The leading and trailing slopes of the horizontal and vertical blanking and horizontal and vertical synchronizing pulses must also meet specified characteristics. Systems in accordance with the prior art achieve these results only through the use of considerable equipment, and in particular have had difficulty in obtaining immunity from noise and in recovering with sufficient speed following interruption of vertical blanking.

The arrangement of FIGURE 2, on the other hand, obviates these and other difficulties in a simple and extremely reliable manner, and utilizes the noise immunity of the RF synchronizing signal stripper circuit in an advantageous manner. The video signal information contained in the composite television signal is applied through the video delay line 20 and the cathode followers 52 to the video amplifier 55 and thence to the output circuit 65. With appropriate pedestal height adjustment made at the pedestal height adjustment circuit 53, and with selected settings of the video output level adjustment 56 and the output impedance adjustment 66, this arrangement provides the flexibility and precision needed for formation of a television broadcast signal meeting the required standards. The RF stripped sync pulses are also applied to the keyed clamp circuit 25 which is coupled to the output terminal of the video delay line 20. The delay introduced into the synchronizing signals by the stripper circuit is compensated for by a like delay introduced into the video signal portions, so that the synchronizing and video signal portions are returned to their original time relation. When the keyed clamp circuit 25 is keyed by a synchronizing pulse, therefore, the output signal from the video delay line 20 is shifted materially, here in the positive-going direction.

The desired blanking level, for both the horizontal and vertical blanking intervals, is then reestablished in the composite video signal, by application of the control gating signals from the blanking "OR" gate and cathode follower 37 and through the blanking adder diode 50 to the output terminal of the cathode follower 52. The manner in which horizontal blanking pulses are generated in response to horizontal synchronizing pulses may best be understood by making reference to FIGURE 6 in conjunction with FIGURE 2. As shown at (A) in FIGURE 6, the stripped horizontal synchronizing pulses, spaced 63.5 microseconds apart, appear as substantially rectangular pulses. The synchronizing pulses (FIGURE 6A) are differentiated to provide negative going and positive-going signal spikes which appear coincidently with the leading and trailing edges of the horizontal synchronizing pulses, as shown at (B) in FIGURE 6. The positive spikes are clipped from the signal, and each negative spike which corresponds to the leading edge of the synchronizing pulses then triggers the fixed delay phantastron 28, which provides a substantially rectangular pulse of approximately 31 microseconds duration, as shown at (C) in FIGURE 6. Each rectangular pulse (FIGURE 6C) is applied from the fixed delay phantastron 28 to the variable delay phantastron 30 after it is differentiated to provide a negative-going spike coincident with its trailing edge, and a positive-going leading edge spike which is clipped off. The successive negative-going spikes trigger the variable delay phantastron 30, which provides rectangular output pulses (waveform (E) in FIGURE 6) whose trailing edges are subsequently made to successively mark the beginnings of the horizontal blanking intervals. The setting of the variable delay phantastron 30 may be adjusted so that these trailing edges occur substantially one television line time after the initiating pulse.

Figure 6:
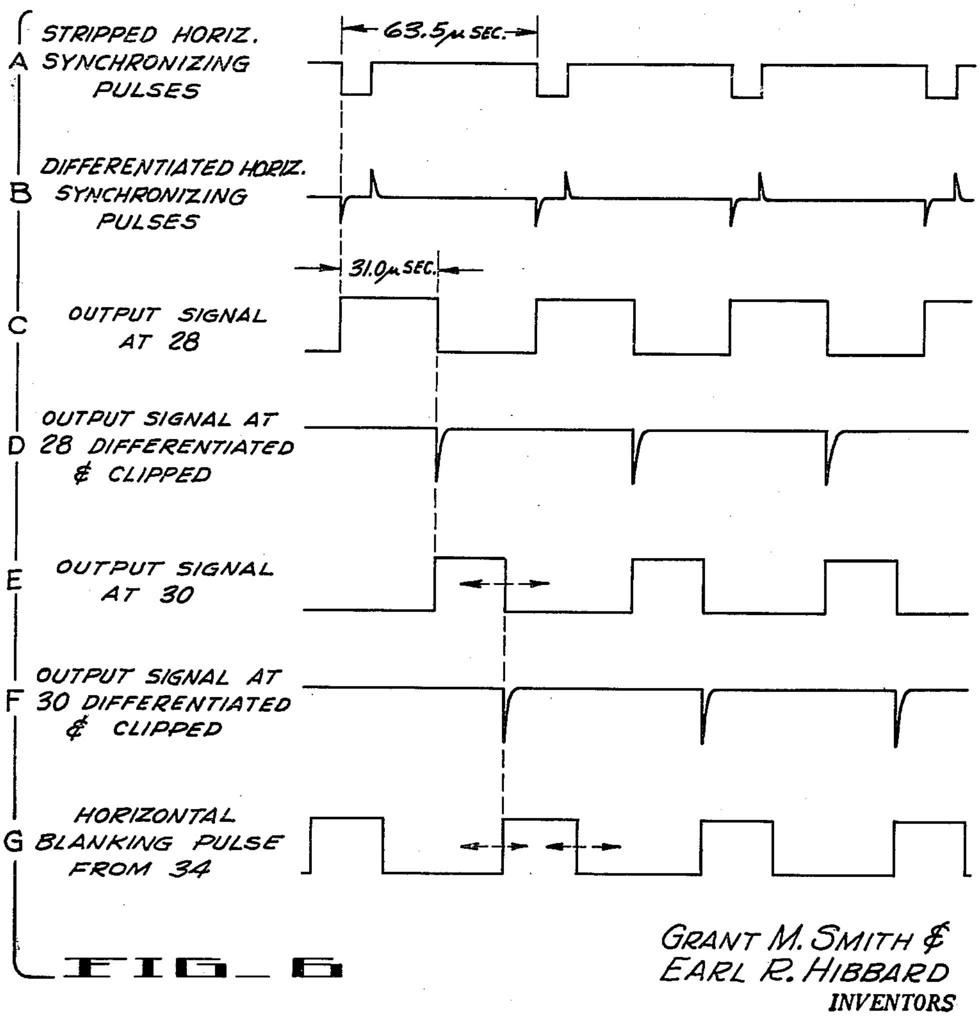

Upon differentiating and clipping the pulses of waveform (E), negative-going spikes (FIGURE 6F) which are coincident with the trailing edges of the rectangular pulse (FIGURE 6E) trigger the horizontal blanking monostable multivibrator 34 to provide sharply defined rectangular pulses (waveform (G) in FIGURE 6) of the precise duration desired for the horizontal blanking interval. Because of the horizontal blanking position adjustment device 31 and the horizontal blanking width adjustment 35, both the leading and trailing edges of the horizontal blanking pulses may be adjusted in time. These adjustments may take into account the relatively minute time intervals needed to trigger the various circuits, so that each horizontal blanking pulse follows precisely one television line time after the start of the previous blanking interval which initiated the delayed pulse sequence. As each horizontal blanking pulse is applied to the blanking "OR" gate and cathode follower 37 and through the blanking adder diode 50, the amplitude of the output signal provided from the cathode follower 52 is maintained at the desired blanking level, concurrently removing the amplitude-shifted old blanking and synchronizing signals. The slopes of the leading and trailing edges of the horizontal blanking, however, remain substantially vertical and clearly defined.

In like manner, vertical blanking pulses of longer duration are generated by the vertical blanking monostable multivibrator 46 at the proper time, as controlled by the vertical blanking position adjustment 44, and for the desired duration (one television field time), as controlled by the vertical blanking width adjustment 47. The sequence is initiated only upon application of the predetermined sequence of stripped synchronizing signals to the integrator amplifier 40, which insures that the vertical blanking interval sequence will not be initiated erroneously by application of stripped horizontal synchronizing pulses. The fixed delay phantastron 41 and the variable delay phantastron 43 provide a total delay in triggering the vertical blanking monostable multivibrator 46 which is equal to one television field time. The considerable delay which this entails does not, however, affect the precise and stable operation which is required. The vertical blanking interval may be placed in time, by such arrangements, with an accuracy of better than 1/10 of 1%. Blanking generator circuits thus arranged are substantially unaffected by changes in temperature, supply voltage variation and the like. Individual adjustments may be made in blanking width or position, without causing an interaction with other settings. The output signals provided by the monostable multivibrators 46 and 34 are used directly to define the blanking intervals, without further wave shaping or pulse forming.

Following redefinition of the blanking in this manner, the synchronizing signals having an amplitude peak determined by the synchronizing signal level adjustment 23 may be reinserted at the video amplifier 55 from the adder amplifier 22. If color transmission is to be provided, the color bursts are initiated by the 3.58 mc. burst generator 60 and provided in a selected phase reltaionship determined by the phase delay device 61 to the video amplifier 55. Color bursts are added into the composite television signal in the same way the synchronizing pulses are reinserted. The fully reconstituted composite television signal therefore appears on the two terminals of the ouput circuit 65, at the desired impedance level established by the output impedance adjustment means 66. The wave shapes of the blanking and synchronizing pulses are preserved by this arrangement, which is furthermore virtually immune to the introduction of noise. The system makes full use of the freedom from switching transients of the RF type of synchronizing signal stripper circuit.

In the past, phase locked circuits have been used to control the blanking intervals of the broadcast signal. Such circuits are complex, difficult to adjust, and may lose control over the synchronizing signal for a considerable interval following signal interruption. Systems in accordance with the present invention, however, achieve a considerable simplification of circuitry but at the same time provide greater versatility while avoiding loss of precision.

Although specific arrangements of the invention have been mentioned and described above in order to illustrate the operation thereof, it will be appreciated that the invention is not to be restricted to these arrangements. Accordingly, any and all modifications, variations, or equivalent arrangements falling within the scope of the annexed claims should be considered to be a part of the invention.

What is claimed is:

1. A circuit for adding new blanking signals to a composite television signal including the combination of means responsive to the vertical and horizontal synchronizing signals of the composite television signals for generating delayed timing pulses, a first pulse generator means responsive to the delayed timing pulses which result from vertical synchronizing signals for generating vertical blanking pulses which are delayed substantially one television field in time, a second pulse generator means responsive to the delayed timing pulses which result from horizontal synchronizing signals for generating horizontal blanking pulses which are delayed substantially one television line in time, and means responsive to the initial television signal and the vertical and horizontal blanking pulses for maintaining the television signal at selected signal amplitudes during time intervals defined by the durations of the vertical and horizontal blanking pulses, thereby inserting new blanking signals at the selected signal amplitudes.

2. A circuit for adding new blanking signals to a composite television signal including means responsive to the composite television signal for stripping synchronizing signals therefrom, means responsive to the stripped synchronizing signals and to the composite television signal for modifying the blanking levels in the composite television signal, a pair of pulse generator means, each responsive to different ones of the stripped synchronizing signals for generating blanking pulses, and means responsive to the blanking pulses and to the modified composite television signal for reinserting blanking into the composite television signal.

3. A circuit for inserting signals of selected amplitude and duration into a composite signal containing cyclically occurring marking pulses including means responsive to the marking pulses for generating delayed timing pulses, means responsive to the delayed timing pulses for generating control pulses which are delayed a selected amount relative to the cyclic marking pulses and which have a selected duration, and means responsive to the composite signal and to the control pulses for maintaining the amplitude of the composite signal at selected levels for intervals defined by the control pulses.

4. A system for providing controlled blanking intervals in a composite television signal including the combination of means responsive to the synchronizing signals in the composite television signal for generating delayed pulses which defined the time limits of blanking intervals, and means responsive to the composite television signal and the delayed pulses for adding blanking to the composite television signal under the control of the delayed pulses.

5. A system for providing controlled signal intervals in a composite cyclic signal including timing marker pulses occurring in a selected cyclic sequence, the system comprising means responsive to the marker pulses in the composite signal for generating different delay control pulses whose leading and trailing edges define the time limits of a selected interval having a predetermined relation in time to the composite cyclic signal, means responsive to the composite cyclic signal and the control pulses for maintaining the composite cyclic signal at selected amplitudes during the provision of control pulses, and means responsive to the control pulses for reinserting the control pulses in the controlled amplitude portions of the composite cyclic signal.

6. A signal processing system for providing a broadcast quality composite television signal including video portions and synchronizing signal portions, comprising synchronizing signal stripper means responsive to a composite television signal, means responsive to the synchronizing signal stripper means for deriving horizontal and vertical blanking pulses, means for delaying the horizontal blanking pulses substantially one line time with respect to an initiating synchronizing pulse, means for delaying the vertical blanking pulses substantially one field time with respect to initial synchronizing pulses, and blanking adder means coupled to receive the composite video signal and the horizontal and vertical blanking pulses, for adding blanking at a controlled signal amplitude to the composite television signal for intervals defined by the horizontal and vertical blanking pulses.

7. A system for generating a television signal of broadcast quality from reproduced television signals which include video portions, vertical and horizontal synchronizing signal portions and vertical and horizontal blanking signal portions comprising means responsive to the original television signal and the vertical and horizontal synchronizing signal portions thereof for generating delayed timing pulses corresponding to the vertical and horizontal synchronizing signals, delay means responsive to the original television signals for delaying the television signals to place the video portions in their initial time relation to the vertical and horizontal synchronizing and blanking signal portions, means responsive to the delayed timing pulses which result from vertical synchronizing pulses for generating vertical blanking pulses which are delayed one television field in time, means responsive to the delayed timing pulses which result from horizontal synchronizing pulses for generating horizontal blanking pulses which are delayed one television line in time, and means responsive to the delayed television signals, the delayed timing pulses and the vertical blanking and horizontal blanking pulses for reinserting the blanking and synchronizing signals in the delayed television signal.

8. A system for generating a television signal suitable for broadcast purposes from reproduced television signals including the combination of means for reproducing a television signal including video signal portions, vertical and horizontal synchronizing signals and vertical and horizontal blanking signals, synchronizing signal stripper means responsive to the reproduced television signals for generating delayed timing pulses corresponding to the vertical and horizontal synchronizing pulses, video delay means responsive to the produced television signals for delaying the television signals in time an amount corresponding to the delay introduced by the cynchronizing signal stripper means, vertical blanking means responsive to the delayed timing pulses for the synchronizing signal stripper means which correspond to the vertical synchronizing signals for generating vertical blanking pulses which are delayed by one television field time, horizontal blanking means responsive to the delayed timing pulses from the synchronizing signal stripper means which correspond to the horizontal synchronizing signals for generating horizontal blanking pulses which are delayed by one television line time, blanking adder means responsive to the delayed television signals and the vertical and horizontal blanking pulses for inserting new blanking into the delayed television signals, and synchronizing signal reinsertion means responsive to signals from the blanking adder means and the delayed timing pulses for superimposing synchronizing signals on the added blanking of the delayed television signals.

9. A system for generating a television signal suitable for broadcast purposes from reproduced television signals including means for reproducing the television signal, synchronizing signal stripper means responsive to the reproduced television signals for generating delayed timing pulses corresponding to the vertical and horizontal synchronizing pulses, video delay means responsive to the reproduced television signals for delaying the television signals in time by an amount coresponding to the delay introduced by the synchronizing signal stripper means, blanking signal generator means including a pair of time delay phantastron pulse generator circuits responsive to the delayed timing pulses for providing blanking pulses which are delayed by a periodic interval established by the composite television signal, blanking adder means responsive to the delayed television signals and to the blanking pulses for inserting new blanking into the delayed television signals, and synchronizing signal reinsertion means responsive to signals from the blanking adder means and the delayed timing pulses for superimposing synchronizing signals on the added blanking of the delayed television signals.

10. A system for providing a broadcast quality composite television signal including means for reproducing a composite television signal, means responsive to horizontal synchronizing pulses in the composite television signal for generating horizontal blanking pulses whose leading and trailing edges define the time limits of a blanking interval delayed one television line time from the initiating horizontal synchronizing pulse, means responsive to a succession of pulses occurring during a vertical blanking interval for generating a delayed vertical blanking pulse whose leading and trailing edges define the time limits of a vertical blanking interval delayed one television field time from the blanking interval containing the initiating series of pulses, and means responsive to the composite television signal and to the vertical and horizontal blanking pulses for adding new blanking to the composite television signal during intervals established by the horizontal and blanking pulses.

11. A system for inserting blanking and synchronizing signals into a composite reproduced television signal to provide a television signal suitable for broadcast, including the combination of means responsive to the vertical and horizontal synchronizing signals of the original television signal for generating delayed timing pulses representative of the vertical and horizontal synchronizing signals occurring during vertical and horizontal blanking intervals, video delay means responsive to the composite television signal for introducing a delay thereto corresponding in amount to the delay introduced in generating the delayed timing pulses, vertical blanking pulse generator means responsive to delayed timing pulses resulting from vertical blanking intervals and including integrator means, fixed delay phantastron means, variable delay phantastron means and a monostable multivibrator coupled in tandem to provide a vertical blanking pulse of selected duration from the monostable multivibrator and having a time delay of substantially one television field interval subsequent to the initiating vertical blanking interval, horizontal blanking pulse generator means responsive to delayed timing pulses resulting from horizontal blanking intervals and including fixed delay phantastron means, variable delay phantastron means and a monostable multivibrator coupled in tandem to provide a horizontal blanking pulse from the monostable multivibrator at an interval substantially one television line interval subsequent to the initiating horizontal blanking interval, blanking adder means responsive to the delayed television signal and the vertical and horizontal blanking pulses for maintaining the television signal at a selected blanking level for intervals controlled by the vertical and horizontal blanking pulses, and synchronizing signal and color burst reinsertion means coupled to the blanking adder means and responsive to the delayed timing pulses.

12. A television blanking and synchronizing signal generator including the combination of means responsive to composite television signals for selecting synchronizing signals therefrom to provide delayed timing signals, first and second delayed pulse generator means responsive to the timing signals, the first of the pulse generator means being responsive to timing signals representative of vertical synchronizing signals for generating delayed vertical blanking pulses, the second of the pulse generators being responsive to timing signals representative of horizontal synchronizing signals for generating delayed horizontal blanking pulses, delay means responsive to the composite television signal for introducing a delay therein to place the video portions in desired time relationship to the delayed timing signals and the vertical and horizontal blanking pulses, blanking adder means coupled to receive the composite delayed television signal and responsive to the horizontal and vertical blanking pulses for inserting new blanking therein while concurrently removing the previous blanking and synchronizing signals, and synchronizing signal adder means responsive to the delayed timing signals and to the composite television signal with new blanking, for superimposing the synchronizing signals on the new blanking.

13. A television signal generating system for inserting precise blanking and synchronizing signals in reproduced television signals comprising means responsive to the reproduced television signals for selecting synchronizing signals therefrom to provide delayed timing pulses representative of the horizontal and vertical synchronizing signals, a pair of delayed pulse generator means responsive to the delayed timing pulses, a first of the delayed pulse generator means including integrator means for selecting vertical synchronizing signal intervals, fixed delay pulse generator means coupled to the integrator means, variable delay pulse generator means coupled to the fixed delay pulse generator means for providing substantially a full television field interval subsequent to a selected vertical synchronizing signal interval, and the first pulse generator also including a monostable multivibrator coupled to the variable delay pulse generator means for providing a vertical blanking pulse of a selected duration, the second pulse generator including a fixed delay pulse generator coupled to receive the delayed timing pulses, a variable delay pulse generator coupled to the fixed delay pulse generator, the variable delay pulse generator and fixed delay pulse generator together providing a delay which is substantially equal to the interval of one television line, and a monostable multivibrator coupled to the variable delay pulse generator for generating horizontal blanking pulses of a selected duration, video delay means receiving the reproduced television signals and introducing a delay therein corresponding to the delay introduced by the means for selecting synchronizing signals, blanking adder means coupled to the video delay means and coupled to receive the horizontal and vertical blanking pulses for maintaining the delayed television signal at a selected blanking level during intervals controlled by the horizontal and vertical blanking pulses, thereby to insert new blanking while removing old blanking and synchronizing signals, color burst generator means, and synchronizing signal and color burst adder means coupled to the means for selecting synchronizing signals and to the color burst generator means and coupled to receive the delayed television signal having blanking added and to reinsert synchronizing signals during the blanking intervals under control of the delayed timing pulses and color bursts from color burst generator means.

References Cited in the file of this patent

UNITED STATES PATENTS 2,979,557 Schroeder ---------------- Apr. 11, 1961